United States Patent
Tomasik et al.

(10) Patent No.: US 10,292,106 B2
(45) Date of Patent: May 14, 2019

(54) METHOD AND APPARATUS FOR MANAGING POWER FOR A DEVICE

(71) Applicant: MOTOROLA SOLUTIONS, INC, Chicago, IL (US)

(72) Inventors: Pawel Tomasik, Tomaszow Mazowiecki (PL); Grzegorz Kaplita, Rzeszów (PL); Marta Musik, Rybnik (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/776,865

(22) PCT Filed: Jan. 29, 2016

(86) PCT No.: PCT/PL2016/050001
§ 371 (c)(1),
(2) Date: May 17, 2018

(87) PCT Pub. No.: WO2017/131537
PCT Pub. Date: Aug. 3, 2017

(65) Prior Publication Data
US 2018/0338288 A1 Nov. 22, 2018

(51) Int. Cl.
*H04W 52/02* (2009.01)
*H04M 1/725* (2006.01)

(52) U.S. Cl.
CPC ... *H04W 52/0264* (2013.01); *H04M 1/72536* (2013.01); *H04W 52/0212* (2013.01); *Y02D 70/142* (2018.01); *Y02D 70/144* (2018.01); *Y02D 70/164* (2018.01)

(58) Field of Classification Search
CPC ... H04W 4/90; H04W 76/50; H04W 52/0261; H04W 68/00; H04W 52/0274; H04W 52/028
See application file for complete search history.

(56) References Cited

U.S. PATENT DOCUMENTS

| | | |
|---|---|---|
| 5,481,259 A | 1/1996 | Bane |
| 7,415,623 B2 | 8/2008 | Rapps et al. |
| 7,801,079 B2 | 9/2010 | Saidi et al. |
| 7,969,928 B2 | 6/2011 | Chiricescu et al. |
| (Continued) | | |

FOREIGN PATENT DOCUMENTS

| | | |
|---|---|---|
| WO | 2012115636 A1 | 8/2012 |
| WO | 2014158229 A1 | 10/2014 |

OTHER PUBLICATIONS

The International Search Report and the Written Opinion, corresponding application serial No. PCT/PL2016/050001 filed Jan. 29, 2016, all pages.

*Primary Examiner* — Keith Ferguson

(57) ABSTRACT

A method and apparatus for managing power for devices that may be part of a group is provided herein. During operation a power-management device will transmit a power-management message to a device or group of devices. The message indicates a time period (keep-alive time) and critical services that are to be kept operating for the keep-alive time. In response, the device(s) that receive the message may transmit an information message indicating whether or not a device has enough power to run the services for the keep-alive time.

13 Claims, 4 Drawing Sheets

(56) References Cited

U.S. PATENT DOCUMENTS

| | | |
|---|---|---|
| 8,073,498 B2 | 12/2011 | Reinisch et al. |
| 8,243,639 B2 | 8/2012 | Fonseca, Jr. et al. |
| 8,373,575 B2 | 2/2013 | Boettner et al. |
| 8,639,391 B1 * | 1/2014 | Alberth, Jr. ............ G05B 15/02 340/657 |
| 8,682,317 B2 | 3/2014 | Pinder |
| 8,958,854 B1 | 2/2015 | Morley et al. |
| 2006/0047800 A1 * | 3/2006 | Caveney ................ H04L 41/00 709/223 |
| 2007/0155429 A1 * | 7/2007 | Levy .................... H04W 24/10 455/557 |
| 2008/0102903 A1 | 5/2008 | Schultz et al. |
| 2012/0210325 A1 | 8/2012 | De Lind Van Wijngaarden et al. |
| 2015/0012147 A1 | 1/2015 | Haghighat-Kashani et al. |
| 2015/0019889 A1 | 1/2015 | Banerjee |
| 2015/0063181 A1 | 3/2015 | Haro et al. |
| 2015/0081127 A1 * | 3/2015 | Bhageria ................. H02J 4/00 700/295 |

\* cited by examiner

METHOD AND APPARATUS FOR MANAGING POWER FOR A DEVICE

FIELD OF THE INVENTION

The present invention generally relates to power management, and more particularly to a method and apparatus for managing power for a device or devices that are part of a group.

BACKGROUND OF THE INVENTION

Modern two-way radio systems feature talkgroup creation where it is possible for a radio to be a member of any combination of talkgroups. As a member of a talkgroup, a radio may receive transmissions from, as well as transmit to all members of the talkgroup. Transmission and reception of information to radios outside of an assigned talkgroup is generally not performed. Illustratively, a radio assigned to an ambulance may be a member of a Fire & Rescue talkgroup as well as a Law Enforcement talkgroup. Therefore, the radio may communicate with all members of the Fire & Rescue talkgroup as well as the Law Enforcement talkgroup.

Sometimes it is desired for all devices in a group (e.g. a talkgroup, but can be also any group of devices configured in infrastructure) to keep powered up for a particular period of time. For example, a group of rescuers may be sent to a remote location, and may need to have their devices powered up for the duration of the rescue. In order to accomplish this, users of devices may power down certain services. However, a group leader may want to ensure that all group members will have certain services available and still have enough battery to power the device for the incident time. Therefore, a need exists for a method and apparatus for managing power for devices that are part of a group that assures that all members of the group will have necessary services available for a particular duration.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
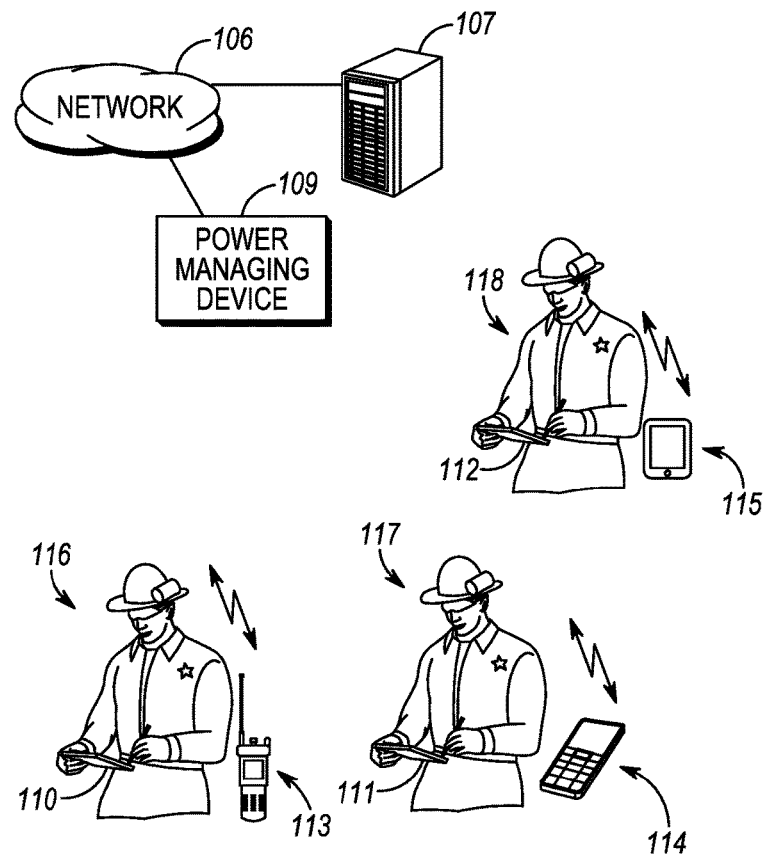
FIG. 1 illustrates a general operating environment.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above, mentioned need, a method and apparatus for managing power for devices that may be part of a group is provided herein. During operation a power-management device will transmit a power-management message to a device or group of devices. The message indicates a time period (keep-alive time) and critical services that are to be kept operating for the keep-alive time. In response, the device(s) that receive the message may transmit an information message indicating whether or not a device has enough power to run the services for the keep-alive time.

Note that the term "service" is meant to encompass any function, application, hardware, or software that may be run by a device. Therefore, while the specification is written describing critical and non-critical "services", one of ordinary skill in the art will recognize that this term is meant to describe any function of a device that may be turned off or powered down in order to save battery consumption. Such services include, but are not limited to location services (e.g., GPS) employing a GPS receiver, data services, radiation detectors, toxic gas detectors, . . . , etc. It should be noted that the critical services need not be supplied by a radio that receives the message. For example, sensors do not need to be mounted (or part of) the mobile radio receiving the message. Additionally, a identified critical device may be part of a Personal Area Network of the group member.

Upon receipt of the message, group member devices automatically apply a power profile to meet the keep-alive time requirement while still running the identified critical services. Critical services identified in the power-management message cannot be turned off by devices that receive the message. Other services may be enabled only if the device's keep-alive time is not violated. In other words, other services may be activated by group members devices only if the device will have enough power to run the service and also last through the time period specified in the message (keep-alive time).

Consider the following example: A group of rescuers are sent to a remote incident scene, with members of the group carrying devices that need to be powered on for a duration of the incident. A group leader has a device that serves as a power-management device. The group-leader device also shows group members location in real time on a map and the group leader finds this service critical for the particular incident. The group leader uses his device to mark GPS as an critical service and sets an estimated incident time (e.g., 4 hours). A power-management message is sent from the group leader's device to all group devices that are part of the incident. The power-management message indicates the estimated incident time (4 hours) and also indicates GPS as a critical service.

Group members' devices automatically apply a power profile to meet this request. In other words, group member devices will be unable to turn off GPS, and will have other services inactivated. As mentioned above, the other services may be activated by group members devices only if the device will have enough power to run the other services and the critical services and have enough battery power to last through the time period specified in the message (keep-alive time).

In a particular embodiment, the power-management message may also contain a list of services that should be inactivated. For example, in the above example, the message may contain WiFi and a camera service as part of a list of services that should be inactivated. Upon receipt of the power-management message, the group devices may automatically inactivate (turn off) the identified applications/services that should be inactivated. The services may be activated by group members devices only if the device will have enough power to last through the time period specified in the message (keep-alive time). In an alternate embodiment of the present invention, the non-critical services will only be turned off upon receipt of the power-management message if there is not enough battery reserves to run the non-critical service for the identified time period.

In another embodiment, the non-group-leader devices may respond to the message by transmitting a second message (information message) back to the group-leader device. The second message will indicate the device's ability to run the necessary service for the time period. If the group-leader device determines that some group members may not be able to keep all critical services running for the keep-alive time, the group leader may make a decision to run fewer critical services. The group leader may again instruct the group-leader device to send out another message updating the critical services.

In the above description the power-management device happened to be a device that is part of a group of devices. It should be noted that the power-management device may exist in other network components instead of a group device. For example, a dispatch center may perform the task of power management. So, for example, the dispatch center may comprise a power management function (power-management device) that determines critical services, and instructs/messages devices as described above. Alternatively, a stand-alone network service may perform the functions set forth above.

FIG. 1 illustrates a general operating environment at an incident scene. As shown in FIG. 1, multiple officers 116-118 are at the incident scene. Each officer has at least one piece of equipment that is associated with (operated by) the officer. For example, FIG. 1 shows officer 116 operating tablet computer 110, and having radio 113 assigned to him. Officer 117 is shown operating tablet computer 111 and having radio 114 assigned to him, while officer 118 is operating tablet computer 112 and has radio 115 assigned to him. Radios 113-115 may comprise such things as smart phones and/or broadband devices.

Tablet computers 110-112 and radios 113-115 are preferably capable of communicating with each other via network 106, or alternatively, these devices may communicate with each other via direct peer-to-peer wireless communications between devices. Devices 110-115 comprise receivers and transmitters that operate utilizing one of many wireless protocols. For example devices 110-115 may utilize the APCO P25 (Project 25) communication system protocol. Other possible transmitters and receivers include, IEEE 802.11 communication system protocol, transceivers utilizing Bluetooth, HyperLAN protocols, or any other communication system protocol.

Optional power-management device 109 is shown attached to network 106. As discussed above, there may exist an embodiment of the present invention where an entity separate from devices 110-115 serve to control the power of devices 110-115 as described above. The functionality of power-management device 109 may also exist in any (and) all devices 110-115.

Network 106 may comprise one of any number of over-the-air networks. For example network 106 may comprise a private 802.11 network set up by a building operator, a next-generation cellular communications network operated by a cellular service provider, or any public-safety network such as an APCO P25 network or the FirstNet broadband network.

As discussed above, it would be beneficial to identify critical services needed at an incident scene and make sure that devices 110-115 have enough power to run those critical services for a particular period of time. With this in mind, a device (which may be power-management device 109) performs the task of:

identifying a device or group of devices 110-115;
identifying critical services that need to be run by a device or group of devices 110-115 at a particular incident;
identify a time period that the critical services may need to be run;
send a message to all devices that identifies the critical services and the time period; and
optionally receive a message back from the devices that indicate whether or not they have enough battery power to run the critical services for the time period.

It should be noted that the message sent to all devices may cause the devices to be unable to halt the identified critical services. Also, devices that receive the message may automatically turn off non-critical services (which may be identified in the message). The non-critical services may be turned on again if the device decides that it can run the non-critical service and not run out of power during the time period.

As discussed above, devices that receive the message may respond with a second message indicating their ability to remain powered up during the time period while running the identified critical services.

Figure 2:
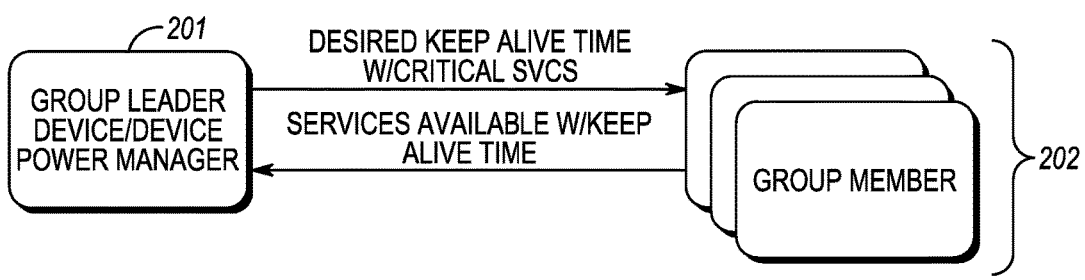
FIG. 2 illustrates a message flow between a group leader device or a power manager and a group member.

FIG. 2 illustrates the message flow between a group leader device or power manager 201 and group members 202. As shown, device 201 transmits a message to group members 202. The message may be sent individually (i.e., one message sent to each device) or may be sent via a broadcast message (i.e., one message transmitted to all devices simultaneously). As discussed above, the message may be transmitted through network 106 or may be transmitted directly in a peer-to-peer fashion between devices 201 and 202.

As described above, the message comprises at least a keep-alive time and those applications/services that are identified as critical. In an alternate embodiment of the present invention, those applications/services deemed not critical may also be identified in the message. In response to transmitting the message, each member 202 of the group may respond by transmitting a second message that indicates if the device has enough battery reserves to keep the device alive for the keep-alive time while still running the critical application/services identified in the message.

Figure 3:
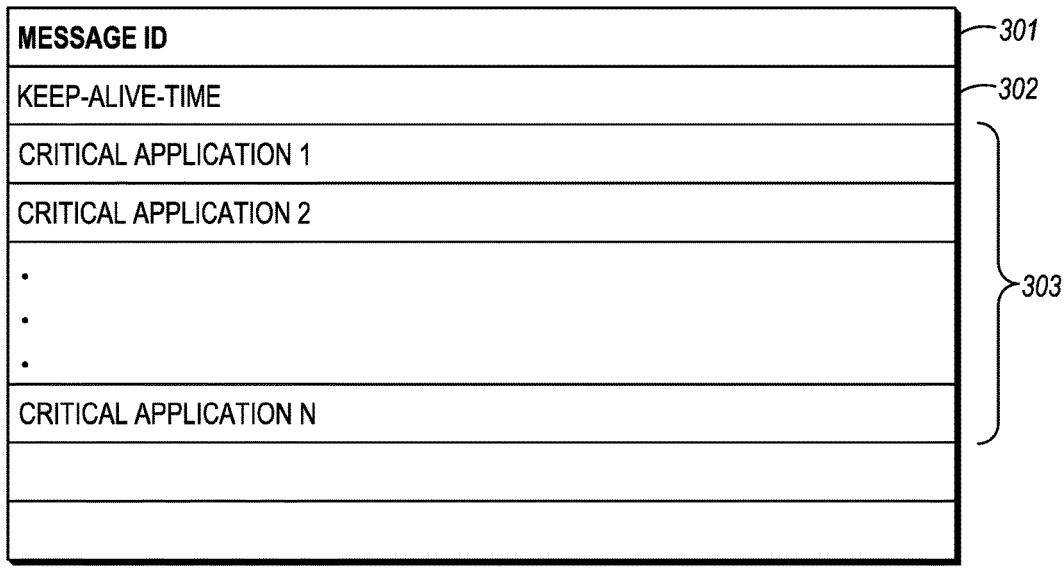
FIG. 3 illustrates a power-management message.

FIG. 3 illustrates message 300 transmitted from entity 201 in FIG. 2. As shown, message 300 comprises a message ID that identifies the message as a power-management message. Keep-Alive time 302 is included along with critical applications 303 that should be kept running for a period of time identified in the keep-alive time field 302. Although not shown in FIG. 3, non-critical services may also be identified within message 300.

Figure 4:
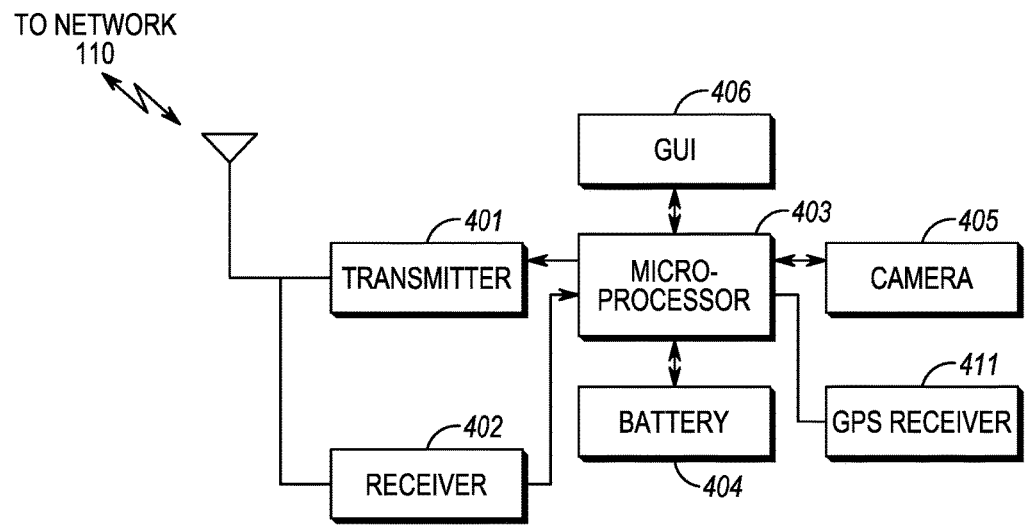
FIG. 4 illustrates a device serving as a power-management device.

FIG. 4 illustrates device 400 serving as a power-management device. Device 400 may comprise a group member device acting as a group leader device, or alternatively may comprise power-management device 109 as shown in FIG. 1. When the components of device 400 are included in a group device, device 400 may also receive power-management messages and act accordingly. As shown, device 400 comprises transmitter 401, receiver 402, graphical user interface (GUI) 406, logic circuitry 403, battery 404, camera 405, and GPS receiver 411.

Transmitter 401 and receiver 402 may be well known circuitry (wired or wireless) used to transmit and receive information. Such circuitry may include long-range and/or short-range transceivers that utilize a private 802.11 network set up by a building operator, a next-generation cellular communications network operated by a cellular service provider, or any public-safety network such as an APCO 25 network or the FirstNet broadband network. Transmitter 401 and receiver 402 may also contain multiple transmitters and receivers, to support multiple communications protocols simultaneously.

GUI 406 may include a touch screen, monitor, a keyboard, a mouse, and/or any combination of the above and other components to provide a man/machine interface.

Logic circuitry 403 comprises a digital signal processor (DSP), general purpose microprocessor, a programmable logic device, or application specific integrated circuit (ASIC) and is utilized to generate the message described in FIG. 3 when acting as a group leader device or device power manager. When acting as a group member, logic circuitry 403 serves to configure device 400 accordingly to ensure that device 400 can remain powered up for a determined period of time. When acting as a group leader or power manager, logic circuitry 403 is configured to construct power-management messages as shown in FIG. 3.

Device 400 when Operating as a Power-Management Device:

When operating as a power-management device GUI 406 receives an input from a user that identifies critical services and a time period. The input may also comprise non-critical services. This information is passed to microprocessor 403. Microprocessor 403 creates a power-management message and passes the message to transmitter 401 with instructions to transmit the message to desired recipients (which may have been identified previously or received from a user at GUI 406). As discussed above, the power management message includes the time period, the critical services, and optionally the non-critical services. In response, receiver 402 receives an information message at receiver 402. As discussed above, the information message will indicate whether or not a particular device is capable of running the critical service for the specified time period without depleting battery reserves.

When performing as a power-management device, device 400 comprises logic circuitry identifying a device or group of devices, identifying critical services that need to be run by the device or group of devices, identifying a time period for the critical services, and constructing a message comprising the critical services and the time period. A transmitter is provided for transmitting the message to the device or group of devices, wherein the message causes the device or group of device to power on the identified critical services.

As discussed above, the message may also cause the device or group of devices to power off non-critical services. The logic circuitry may also identify those non-critical services and include them in any power-management message.

Device 400 may also include a receiver that receives a message from the device or group of devices, wherein the message comprises an indication of whether or not the device or group of devices can run the identified critical services for the time period. This information may be displayed on GUI 406

Device 400 when not Operating as a Power-Management Device:

During operation, receiver 402 will receive a power-management message. As discussed above, the power-management message will comprise a time period and at least one critical service that needs to remain running and may identify non-critical services. Receiver 402 passes the message to logic circuitry 403. Logic circuitry then powers on all identified critical services (e.g., powers on GPS receiver 411). All non-critical services may be powered down (e.g., camera 405). Logic circuitry 403 accesses batter 404 to determine an amount of power left in battery 404 and then determines whether or not battery 404 can sustain running the critical services for the specified period of time. An information message may be created by logic circuitry 403 and passed to transmitter 401 for transmission. As discussed above, the information message comprises an indication as to whether or not device 400 has enough battery reserves to run the identified critical service(s) for the specified period of time.

When acting as a non-power-management device, device 400 comprises a receiver receiving an over-the-air message comprising critical services and a time period. Logic circuitry activates the critical services identified in the message and inactivating non-critical services. As discussed above, the over-the-air message may also comprises the non-critical services and the logic circuitry may determine if the critical services can be run for the time period identified in the message. A transmitter may then transmit a message indicating whether or not the critical services can be run for the time period identified in the message.

Figure 5:
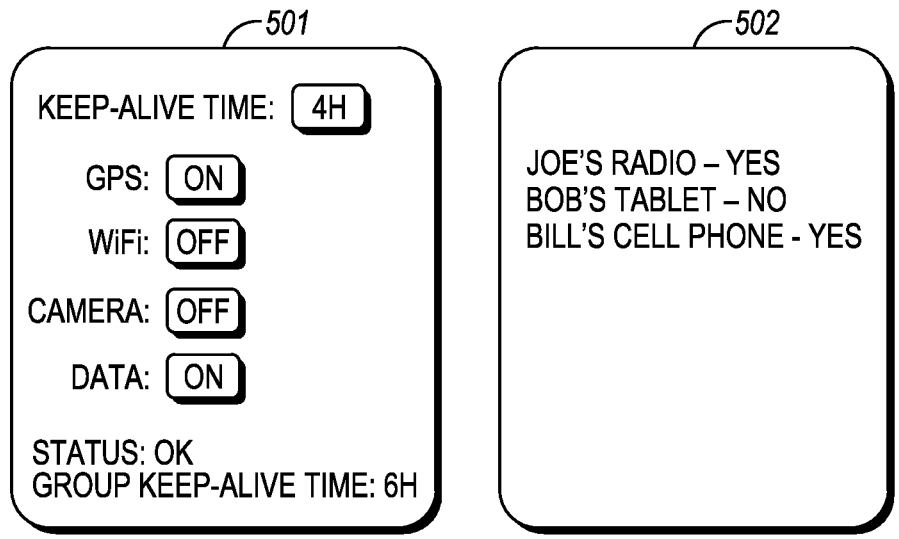
FIG. 5 illustrates a graphical-user interface that may be used to create a power-management message.

FIG. 5 gives an example of what may be displayed at GUI 406 when a device acts as a power-management device. As shown in FIG. 5 a first screen 501 may be used to create a power-management message. As shown, a user may input a time period and whether or not a particular service is to be on or off (critical or not). In response, a second screen 502 may be displayed as to whether or not particular devices are capable of being powered on for the specified time period while running the identified critical services.

Figure 6:
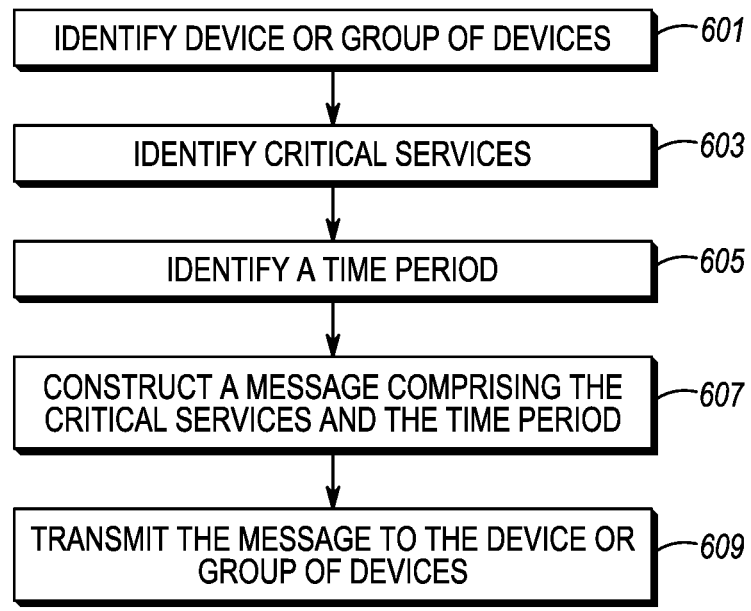
FIG. 6 is a flow chart showing operation of a device used for creating a power-management message.

FIG. 6 is a flow chart showing operation of a device used for creating a power-management message. The logic flow begins at step 601 where logic circuitry identifies a device or group of devices. The identification may be input by a user and obtained from GUI 406, or may be pre-configured and stored in a memory (not shown in FIG. 4). At step 603 logic circuitry 403 identifies critical services that need to be run by the device or group of devices. Again, the critical services may be obtained from GUI 406 or alternatively pre-configured and stored in a memory. At step 605 logic circuitry 403 identifies a time period for the critical services to be run. As discussed above, the time period may be received from GUI 406, or alternatively the time period may be preconfigured and stored in a memory. At step 607 logic circuitry 403 constructs a message comprising the critical services and the time period. Finally, logic circuitry 403 instructs transmitter 401 to transmit the message to the device or group of devices.

As discussed above, the message causes the device or group of device to power on the identified critical services. Additionally, the message may also causes the device or group of devices to power off non-critical services. In a further embodiment of the present invention logic circuitry 403 may identify those non-critical services and the message may be constructed containing those non-critical services.

In a further embodiment of the present invention, receiver 402 may receive a message from the device or group of devices, wherein the message comprises an indication of whether or not the device or group of devices can run the identified critical services for the time period. This information may be displayed by GUI 406.

Figure 7:
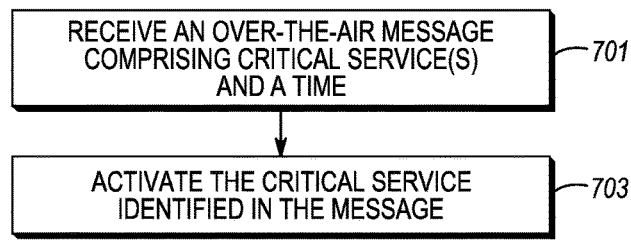
FIG. 7 is a flow chart showing operation of a device after receiving a power-management message.

FIG. 7 is a flow chart showing operation of a device after receiving a power-management message. The logic flow begins at step 701 where receiver 402 receives an over-the-air message comprising critical services and a time period. At step 703 logic circuitry activates the critical services identified in the message and inactivating non-critical services.

As discussed above, the over-the-air message may also comprises the non-critical services, and the logic circuitry may determine if the critical services can be run for the time period identified in the message. Transmitter 401 may transmit a message indicating whether or not the critical services can be run for the time period identified in the message.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for managing device power, the method comprising the steps of:
    identifying via logic circuitry, a device that is a member of a group of devices that are assigned to an incident scene;
    identifying via the logic circuitry, critical applications on the device that need to be run by the group of devices at the incident scene;
    identifying by the logic circuitry, a time period for the critical applications;
    constructing, by the logic circuitry, a message comprising the critical applications and the time period; and
    transmitting, via a transmitter, the message to the device, wherein the message causes the device to power on the identified critical applications on the device.

2. The method of claim 1 wherein the message also causes the device or group of devices to power off non-critical applications.

3. The method of claim 1 further comprising the steps of:
    identifying non-critical applications; and
    wherein the step of constructing the message further comprises the step of constructing the message comprising the non-critical applications; and
    wherein the message further causes the device or group of devices to power off the identified non-critical applications.

4. The method of claim 1 further comprising the steps of:
    receiving, via a receiver, a message from the device or group of devices, wherein the message comprises an indication of whether or not the device or group of devices can run the identified critical applications for the time period; and
    a displaying via a graphical user interface, information on whether or not the device or group of devices can run the identified critical applications for the time period.

5. An apparatus comprising:
    logic circuitry identifying a group of devices at assigned to an incident scene, identifying critical applications on the devices that need to be run by each device that is a member of the group of devices at the incident scene, identifying a time period for the critical applications, and constructing a message comprising the critical applications and the time period; and
    a transmitter transmitting the message to the group of devices, wherein the message causes each device that is part of the group of device to power on the identified critical applications.

6. The apparatus of claim 5 wherein the message also causes the device or group of devices to power off non-critical applications.

7. The apparatus of claim 5 wherein:
    the logic circuitry also identifies non-critical applications; and
    the message further comprises the non-critical applications; and
    wherein the message further causes the device or group of devices to power off the identified non-critical applications.

8. The apparatus of claim 5 further comprising:
    a receiver receiving a message from the device or group of devices, wherein the message comprises an indication of whether or not the device or group of devices can run the identified critical applications for the time period; and
    a graphical-user interface displaying information on whether or not the device or group of devices can run the identified critical applications for the time period.

9. An apparatus comprising:
    a receiver within a device that is part of a group of devices assigned to an incident, the receiver receiving an over-the-air message comprising critical applications needed at an incident scene, and a time period;
    logic circuitry activating the critical applications on the device identified in the message and inactivating non-critical applications.

10. The apparatus of claim 9 wherein the over-the-air message also comprises the non-critical applications.

11. The apparatus of claim 9 wherein the logic circuitry determines if the critical applications can be run for the time period identified in the message.

12. The apparatus of claim 11 further comprising:
    a transmitter, transmitting a message indicating whether or not the critical applications can be run for the time period identified in the message.

13. The apparatus of claim 11 wherein the logic circuitry allows the powering on of non-critical applications only if the critical applications can be run for the time period specified in the message.

* * * * *